US 6,292,953 B1

(12) United States Patent
Beautz

(10) Patent No.: US 6,292,953 B1
(45) Date of Patent: Sep. 25, 2001

(54) INTERCHANGEABLE LATCH SYSTEM

(75) Inventor: Joseph A. Beautz, Forest City, PA (US)

(73) Assignee: Gentex Corporation, Carbondale, PA (US)

( * ) Notice: Subject to any disclaimer, the term of this patent is extended or adjusted under 35 U.S.C. 154(b) by 0 days.

(21) Appl. No.: 09/640,442

(22) Filed: Aug. 17, 2000

(51) Int. Cl.$^7$ ..................................................... A42B 1/24
(52) U.S. Cl. ........................................................ 2/422; 2/6.3
(58) Field of Search .................... 2/6.6, 417, 421, 2/422, 6.3

(56) References Cited

U.S. PATENT DOCUMENTS

| 1,280,322 | * | 10/1918 | Soren ........................................ 2/6.6 |
| 2,371,712 | * | 3/1945 | Scholl et al. ............................ 2/6.6 X |
| 2,871,481 | * | 2/1959 | Gerstin ..................................... 2/6.6 |
| 3,023,134 | * | 2/1962 | Cresswell et al. ........................ 2/6.6 |
| 3,994,023 | * | 11/1976 | Aileo et al. ............................... 2/417 |
| 4,457,461 | * | 7/1984 | Docking et al. ....................... 2/422 X |
| 5,056,162 | * | 10/1991 | Tirums ................................... 2/417 X |
| 5,722,091 | * | 3/1998 | Keller et al. .............................. 2/6.3 |

FOREIGN PATENT DOCUMENTS

| 303876 | * | 10/1919 | (DE) ......................................... 2/6.6 |
| 2508777 | * | 1/1983 | (FR) ......................................... 2/422 |
| 9414349 | * | 7/1994 | (WO) ....................................... 2/422 |

* cited by examiner

Primary Examiner—Rodney M. Lindsey
(74) Attorney, Agent, or Firm—Keusey & Tutunjian, P. C.

(57) ABSTRACT

An interchangeable latch system for configuring a custom fitted inner helmet as a standard platform for mounting different outer helmets thereon. The latch system includes a pair of strikers mounted onto temple panels of the inner helmet and tracks or channel assemblies mounted onto facing inner surfaces of the outer helmet. A fitting fixture may be used to custom fit the inner helmet so that the strikers are located at a preset distance and orientation from the wearer's eyes. For outer helmets equipped with helmet mounted displays, the display may be distanced and oriented from the tracks based on the known striker-to-eye distance, to establish a desired viewing distance.

27 Claims, 4 Drawing Sheets

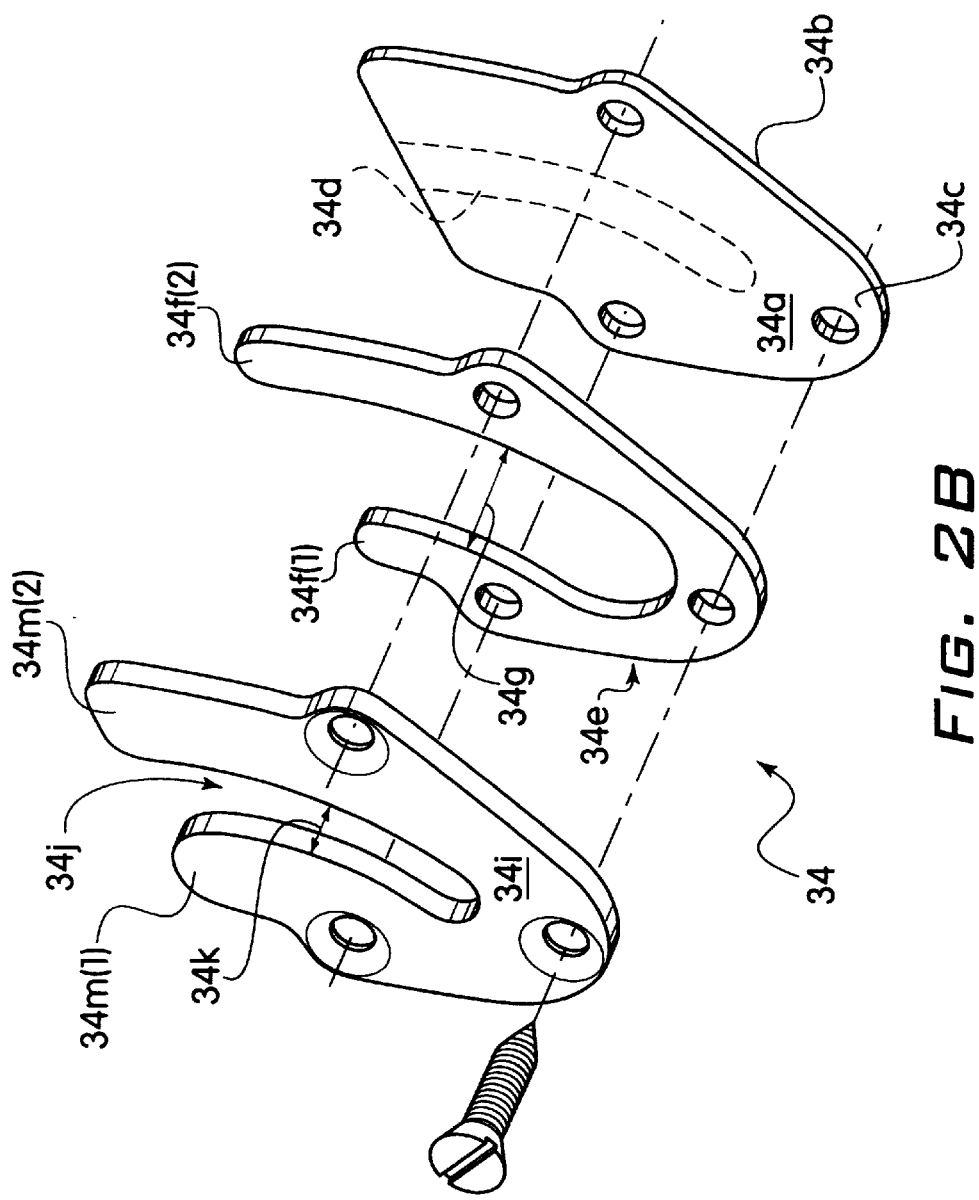
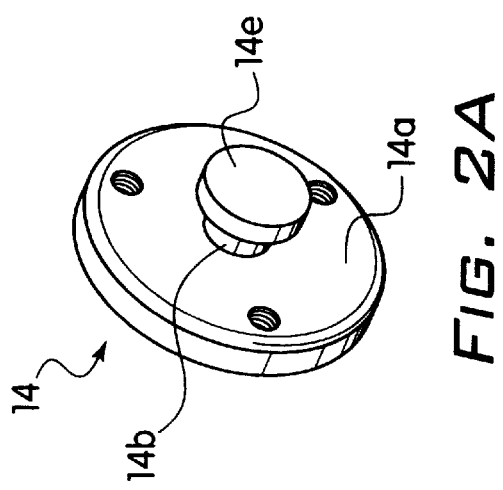
FIG. 2B
FIG. 2A

INTERCHANGEABLE LATCH SYSTEM

FIELD OF THE INVENTION

The invention relates to a latch assembly for interchangeably securing multiple outer devices to an inner helmet.

BACKGROUND OF THE INVENTION

Various forms of military helmets are known according to the prior art. These helmets are constructed to protect the wearer's head against injury while providing communication and life support. In addition modern combat requires military personnel to utilize certain helmet-mounted electronic systems, for example night vision systems and helmet mounted displays.

A problem arises when military personnel need to train with different electronic systems, for example, outer helmet mounted displays for several types of aircraft. These displays have exacting requirements for positioning relative to the wearer's eyes. It has been determined that custom fitted inner helmets are necessary to meet such requirements. However, the outer helmets are too costly to custom fit every crewmember which will maintain or fly the aircraft.

Ideally, a custom fit inner helmet is provided to each individual. For example, an Inner Helmet Assembly pursuant to U.S. Pat. No. 5,584,073.

In order to properly position the inner helmet during custom fitting, a positioning fixture, as disclosed herein, may be utilized. The positioning fixture utilizes the latch assembly of the invention to attach to the inner helmet in the same manner as the ultimate outer helmet. The positioning fixture custom aligns the latch points on the inner helmet for each individual. The custom fittings are then secured to maintain the alignment in a reproducible manner. Accordingly, every custom fitted inner helmet provides a standard platform.

The outer helmets are then equipped with a uniform capture configuration to attach onto this standard platform via the latch assembly of the invention.

SUMMARY OF THE INVENTION

It is therefore a primary object of the present invention to provide a uniform capture assembly disposed on an outer device to latch onto a standard platform of an inner helmet.

It is another object of the present invention to provide a mounting surface on the outer device that assumes a predetermined orientation with respect to the inner helmet platform.

It is a further object of the invention to define a path for the outer device to follow during installation onto the inner helmet.

It is a further object of the invention to provide latch clearances that facilitate engagement and disengagement of the latch components.

It is another object of the invention to provide locking means for releasably securing an outer helmet onto the inner helmet.

These and other related objects are achieved according to an embodiment of the invention by providing a pair of strikers on flat temple panels of an inner helmet. An outer device or helmet includes a pair of inwardly-facing mounting surfaces that face the temple panels in the installed position. Ideally, the temple panels and mounting surfaces are all substantially parallel to each other. An arcuate channel assembly or track is disposed on each mounting surface for capturing a striker. The arc of the channel assembly corresponds to the curve generated by pivoting the outer device from front-to-back over a crown portion of the inner helmet into an installed position. For locking, quarter-turn fasteners located on the outer helmet may extend through holes in the lower, rear portion of the inner helmet to engage an interiorly-secured retention bar.

The channel assembly includes a base portion disposed adjacent the mounting surface, a central spacer portion and an upper portion. The tip end of the striker slidingly contacts the base portion during mounting of the outer helmet. The central spacer portion comprises a pair of arms spaced from the striker head by a distance D. The upper portion comprises a pair of rails spaced from the striker neck by a distance d that is less than D. The rails guide the neck portion along the length of the channel assembly and keep the head out of contact with the central spacer portion. The head and neck portions of the striker have a generally T-shaped cross-sectional profile. A concavity on the head or neck portion slidingly contacts facing regions of the upper portion.

The interchangeable latch system according to the invention is fitted for an outer helmet mounted display as follows. The inner helmet is placed onto the user and the internal fittings, straps, pads and/or cushions are adjusted to an approximate fit. The fitting fixture is installed onto the strikers. The fitting fixture includes fixed alignment guides that are used to view the user's eyes along an eye line $E_L$ that is tangent to both of the front eyeball surfaces. Once aligned the connection line $C_L$ of the strikers is parallel to and separated from the eye line $E_L$ by a known and preset first vector $V_1$ that is the same for all users.

An outer helmet display has a desired viewing distance $V_D$ from the users eyes. The outer helmet possesses a latch line $L_L$ that will be coincident with the inner helmet connection line $C_L$. The distance between the outer helmet latch line $L_L$ and the display is defined by a second vector $V_2$. The viewing distance $V_D$ is equal to $V_2$ minus $V_1$. Once $V_1$ is established, the second vector $V_2$ can be adjusted to obtain any desired viewing distance $V_D$.

The inner helmet connection line $C_L$ is located in the quadrant above and rearwardly of the viewer's eyeballs. In the vertical direction, $C_L$ is generally between the viewer's eyes and the top of the head. The connection points comprise left and right connection points which are disposed in corresponding left and right vertical planes which are outwardly spaced from the viewer's head. The latch points comprise left and right latch points which pivot within corresponding left and right vertical planes which are outwardly spaced from the viewer's head. The viewing distance $V_D$ may extend along a horizontal line of sight wherein $E_L$ is perpendicular to $V_D$. Where the first and second vectors $V_1$ and $V_2$ are in a common plane with the line of sight, $V_1$ and $V_2$ are perpendicular to $E_L$.

BRIEF DESCRIPTION OF THE DRAWINGS

In the accompanying drawings to which reference is made in the instant specification and which are to be read in conjunction therewith and in which like reference numerals are used to indicate like parts in the various views:

FIG. 2A is a front-lower-left side perspective view of an embodiment of a striker adapted for mounting to the inner helmet;

FIG. 2B is an exploded view of an embodiment of an arcuate channel assembly that is adapted for mounting to an outer device;

DESCRIPTION OF THE PREFERRED EMBODIMENTS

Figure 1A:
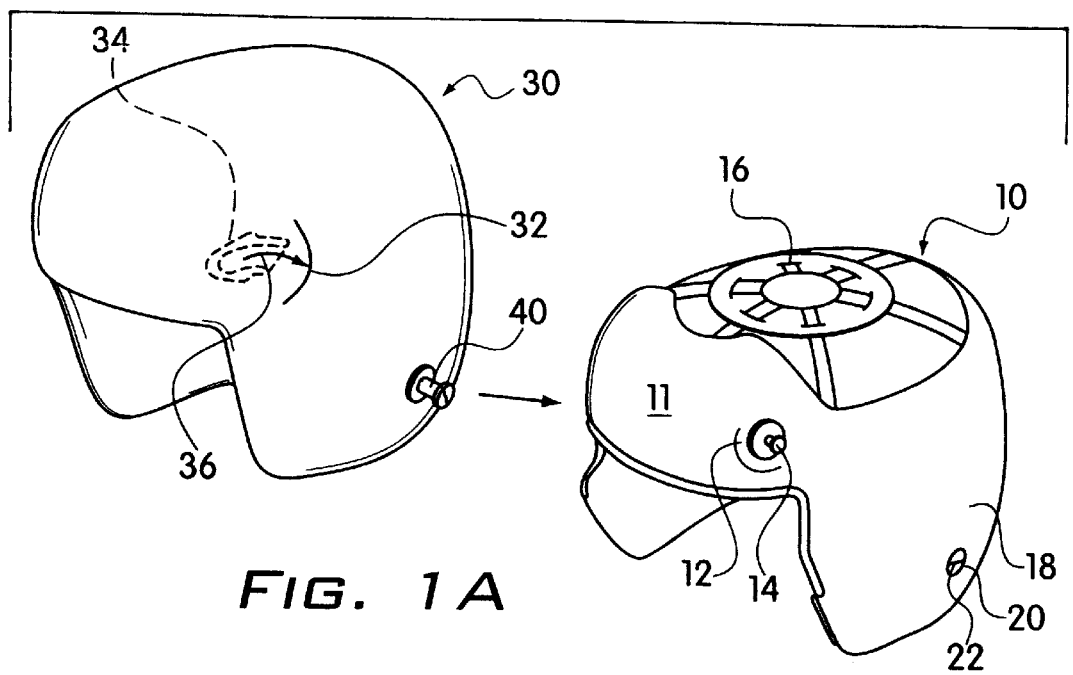
FIG. 1A is a left-front-top side perspective view of an inner and outer helmet equipped with a latch assembly according to the invention.
Figure 1B:
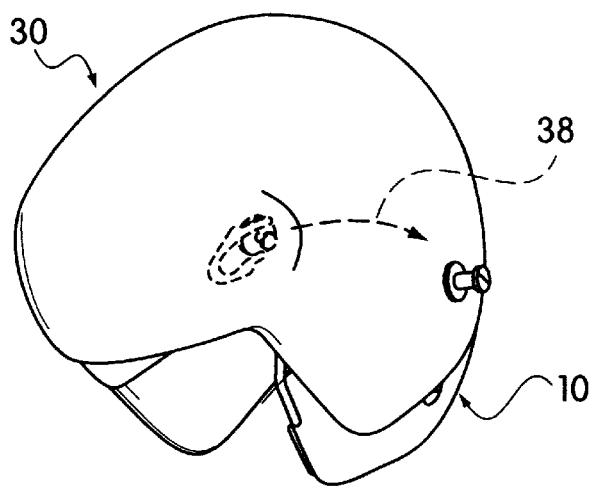
FIG. 1B is a left-front-top side perspective view of the outer helmet initially engaging the inner helmet latch component.
Figure 1C:
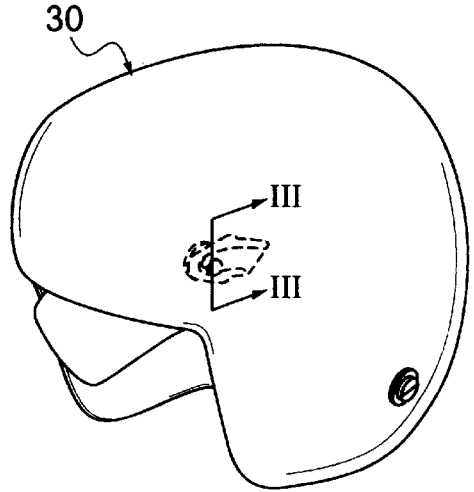
FIG. 1C is a left-front-top side perspective view of the outer helmet fully installed on the inner helmet.

Referring now in detail to the drawings, and in particular FIGS. 1A, 1B and 1C, there is shown a series of views illustrating mounting of an outer helmet 30 onto an inner helmet 10. The inner helmet may be of any type designed for a two-part helmet, for example, a custom-fitted inner helmet assembly. Once properly fitted, the inner helmet operates as a standard platform for mounting various types of outer helmets. The mechanism for obtaining this standard platform on the inner helmet is the interchangeable latch assembly and fitting fixture of the invention. Thus, a highly specialized or very expensive outer helmet can be mounted onto many different custom-fitted inner helmets.

Inner helmet 10 includes a front forehead dome 11 that generally overlies the wearer's forehead. On each side of front forehead dome 11 there is one temple panel 12. The left side temple panel 12, as viewed from the wearer's perspective, is shown in FIG. 1A. The temple panels are generally located above, forwardly and outwardly from the wearer's temples. The temple panels are flat surfaces, generally parallel to each other. A striker 14 is mounted onto each flat temple panel 12.

Figure 4:
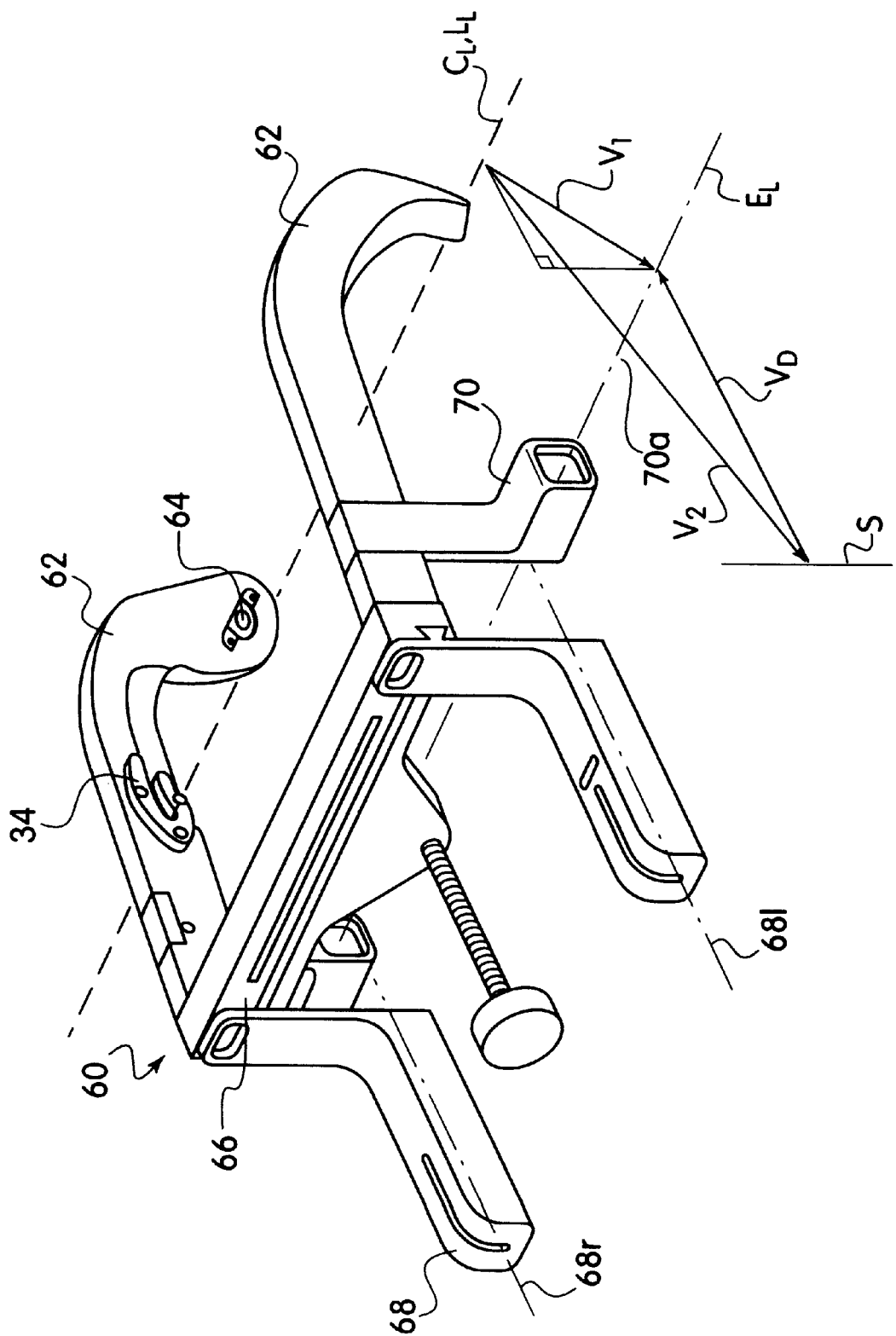
FIG. 4 is a left-front-top side perspective view of an embodiment of a positioning fixture adapted for mounting on to the striker of the inner helmet.

A crown portion 16 is disposed behind front forehead dome 11. Inner helmet 10 also includes a rear portion 18 which has an aperture 20 formed therein for exposing a section of an internally secured retention bar 22. Crown portion 16 and other internal fittings, pads, straps and/or cushions may be adjusted to alter the position at which inner helmet 10 sits on the wearer's head. Fitting is facilitated by the use of an alignment fixture 60 illustrated in FIG. 4, which will be discussed in greater detail below. More particularly, fitting consists of aligning strikers 14 to a predetermined location and orientation with respect to the wearer's eyes.

As can be seen in FIG. 2A, striker 14 includes a dome-shaped base 14a provided with three threaded bores, for example. Machine screws with suitable sized heads extend from the inside of inner helmet 10 through correspondingly sized holes in temple panel 12 and are screwed into the bores on base 14a. In the embodiment shown the central part of the striker base 14a extends upwardly into a neck 14b that terminates in a head 14e.

The interior of outer helmet 30 is provided with a mounting surface 32 in the forward part of outer helmet 30. One mounting surface is provided on either side. The mounting surfaces generally face each other and are generally parallel to each other. An arcuate track or channel assembly 34 is secured onto each mounting surface 32. As can be seen in FIG. 2B, arcuate channel assembly 34 consists generally of a base portion 34a, a central spacer portion 34e and an upper portion 34i. Components 34a, 34e and 34i include apertures in registration with each other. In the embodiment shown, each component has three apertures in a triangular configuration to accommodate screws. The screws pass through the components and are secured into mounting surface 32.

Base portion 34a includes a rear-side 34b that is in contact with mounting surface 32. The front side 34c faces central spacer portion 34e and includes a contact region 34d. The central spacer portion 34e includes a pair of arms 34f(1) and 34f(2) distanced from each other by a nominal arm spacing 34g. Upper portion 34i includes a pair of rails 34m(1) and 34m(2) separated by a slot 34j which overlies the gap between rails 34f(1) and 34f(2). The width of slot 34j is designated as the nominal rail spacing 34k.

As can be seen in FIGS. 1A, 1B and 1C, the arcuate channel assembly is oriented on mounting surface 32 so that striker 14 is able to enter the open end of slot 34j in the position illustrated in FIG. 1B. Rail 34m(1) is the shorter rail and is provided with a smooth rounded end to allow neck 14b to easily slide past it as outer helmet 30 is moved downwardly over inner helmet 10. Rail 34m(2) is the longer rail and is designed to engage neck 14b and guide it in the direction of the arrow for reference numeral 34j. Slot 34j has the shape of an arc 36 that conforms to the shape of a curve 38. Outer helmet 30 follows curve 38 during mounting as the outer helmet pivots into the filly installed position illustrated in FIG. 1C. During the movement between FIGS. 1B and 1C, striker 14 is guided through slot 34j into the terminal position at the base of slot 34j.

Figure 3:
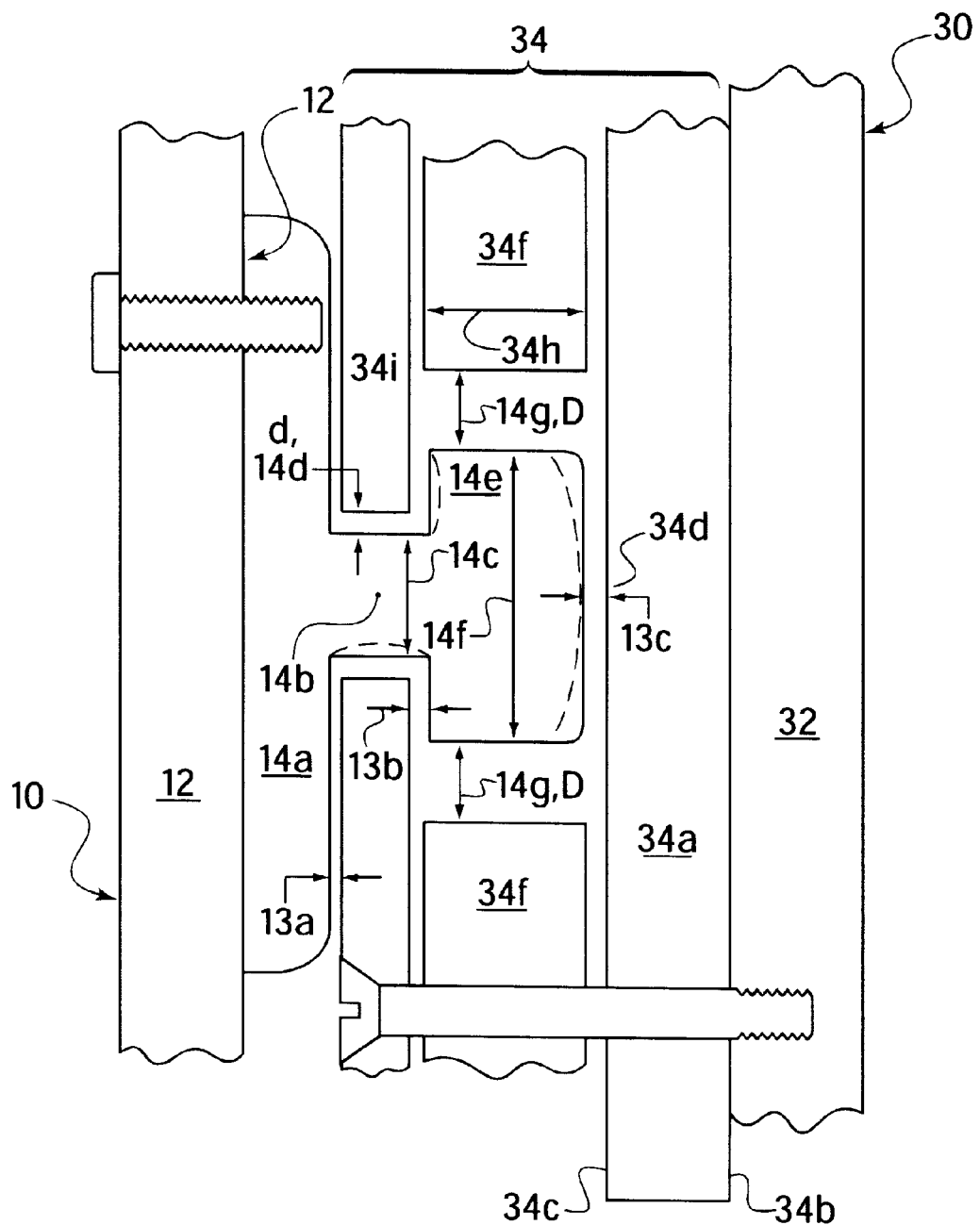
FIG. 3 is a cross-sectional view of the engaged latch taken along the line III—III from FIG. 1C.

FIG. 3 illustrates the spacing between various portions of striker 14 and arcuate channel assembly 34. Striker 14 includes a neck 14b having a neck diameter 14c and a head 14e having a head diameter 14f. Between neck 14b and upper portion 34i there is provided a radial neck clearance 14d on the order of magnitude of several thousandths of an inch. Radial neck clearance 14d is also referred to as d. These distances relate to nominal rail spacing 34k from FIG. 2B as follows:

$$34k = 14c + (2 \times 14d)$$

or $$34k = 14c + (2 \times d)$$

In contrast, a radial head clearance 14g is significantly larger, on the order of magnitude of several hundredths of an inch. Radial head clearance 14g is also referred to as D. These distances relate to nominal arm spacing 34g as follows:

$$34g = 14f + (2 \times 14g)$$

or $$14g = 14f + (2 \times D)$$

The relative difference in clearances 14d (aka d) and 14g (aka D) insures that head 14e will avoid radial contact with arms 34f of central spacer portion 34e during mounting and removing of outer helmet 30. This relationship may be represented as follows:

$$14g > 14d$$

or $$D > d$$

Accordingly, contact and frictional resistance in the radial direction will only occur between neck 14b and upper portion 34i. In order to minimize the aforementioned friction, striker 14 is made from a different metallic material than upper portion 34i or one of the components is provided with a metallic coating different than the other component. In addition neck 14b may be provided with a concave chamfer, as shown in dotted line, to reduce the radial contact area from a line to two points.

In the left-right direction of the drawing three clearances are specified between striker 14 and upper portion 34i and contact region 34d of arcuate channel assembly 34. Clearances 13b and 13c may be of the same distance, on the order of magnitude of several thousandths of an inch. These distances relate to the overall head height as follows:

Height of Head 14e (measured left-to right)=34h–13b–13c–

Clearance 13a is approximately twice that of either 13b or 13c, on the order of magnitude of hundredths of an inch. All three clearances 13a, 13b and 13c are measured with striker 14 centrally positioned in the left-right direction, as illustrated. As a result, the relatively large surface area of base dome 14a is restricted from contacting the facing surface of upper portion 34i. Rather, any left-right movement of striker 14 would result in head 14e contacting either upper portion 34i or base portion 34a. To minimize the contact areas, the left side of head 14e that faces upper portion 34i is provided with a concave chamfer, as illustrated in the drawing in dotted line. The top of head 14e that faces base portion 34a is provided with a convex or dome shaped profile, also illustrated in the drawing in dotted line. Accordingly, upon leftward movement of striker 14, head 14e would contact upper portion 34i along an arc shaped line. Upon displacement of striker 14 to the right, a small circular patch of head 14e would slide along contact region 34d of base portion 34a.

Initially the degree of frictional contact between striker 14 and arcuate channel assembly 34 depends upon the proper spacing of the striker and arcuate channel mounting surfaces on inner helmet 10 and outer helmet 30, respectively. In addition, the mounting surfaces must be parallel to each other so that the clearances are maintained during pivoting of the outer helmet during installation.

The interchangeable latch system according to the invention is installed and used as follows. To begin the custom fitting procedure, the user dons inner helmet 10 equipped with strikers 14. Alignment fixture 60 is mounted onto the strikers in the exact same manner as an outer helmet. The internal fittings, strap, pads, and/or cushions on inner helmet 10 are adjusted until the eye alignment line $E_L$ becomes tangent to the front portion of the user's eyeballs. The left/right eye alignment guides 68r and 68l are used to insure that alignment line $E_L$ is centered on the eyeball in the vertical direction. This establishes a first vector $V_1$ between a connection line $C_L$ extending through the strikers and alignment line $E_L$. The internal fittings, straps, pads, and/or cushions of inner helmet 10 are then tightened or secured to insure that this alignment is always reproduced whenever the inner helmet is donned.

By this fitting procedure, the inner helmets are custom fitted to their respective users. If necessary, several sizes of inner helmets may be provided to accommodate a large anthropometric range of users. The strikers on the various custom fitted helmets, then provide a standard platform onto which an outer helmet can be mounted. The standardization consists of vector $V_1$ being the same for all users.

Both arcuate channel assemblies 34 are installed onto outer helmet 30 so that slots 34j are oriented approximately horizontally when the helmet is upright. As outer helmet 30 is dropped down on to inner helmet 10, both strikers 14 pass beyond lower rails 34f. Necks 14b of the strikers then contact upper rails 34m(2) of upper portion 34i. Outer helmet 30 is rotated rearwardly over a crown portion of the inner helmet. When the outer helmet reaches the terminal position shown in FIG. 1C, fasteners 40 are actuated to prevent inadvertent forward pivoting of outer helmet 30.

Once installed the latch line $L_L$ of arcuate channel assembly 34 becomes aligned with the connection line $C_L$ of striker 14. A second vector $V_2$ extends from the latch line $L_L$ to a viewing surface or display S. The user's viewing distance $V_D$ is the difference in magnitude of the two vectors ($V_2$–$V_1$). If the display is oriented horizontally outward from the viewer's eyeballs, then the difference between the vectors $V_D$ would only possess a horizontal component. Accordingly, if $V_1$ is known from alignment fixture 60, then arcuate channel assemblies 34 can be mounted onto outer helmets at a distance $V_2$ from display surfaces S to achieve a desired viewing distance $V_D$.

It will be understood that certain features and subcombinations are of utility and may be employed without reference to other features and subcombinations. This is contemplated by and is within the scope of our claims. For example, the appended method claims include configurations wherein an arcuate channel assembly or other structure is mounted on the inner helmet and/or a striker or other structure is mounted on the outer device. It is further obvious that various changes may be made in details within the scope of our claims without departing from the spirit of our invention. It is, therefore, to be understood that our invention is not to be limited to the specific details shown and described.

What is claimed is:

1. A system for securing an outer device to an inner helmet having two outwardly-facing temple panels with a striker mounted on each temple panel, wherein the strikers have a head and a neck, the system comprising:

the outer device having a pair of inwardly-facing mounting surfaces, wherein one mounting surface faces each of the temple panels when said device is installed on the inner helmet; and an arcuate channel assembly disposed on each of said mounting surfaces adapted to capture the striker inwardly of said mounting surfaces, wherein the arc of said channel assembly corresponds to a curve generated by pivoting the outer device from front-to-back over a crown portion of the inner helmet into an installed position.

2. The system of claim 1, wherein said outer device comprises an outer helmet.

3. The system of claim 2, wherein said outer helmet further comprises means for locking said outer helmet to said inner helmet to prevent back-to-front pivoting out of the installed position.

4. The system of claim 3, wherein said locking means is disposed in a lower rear portion of said outer helmet.

5. The system of claim 3, wherein said locking means comprises fasteners that extend through said outer helmet to releasably engage the inner helmet.

6. The system of claim 1, wherein each arcuate channel assembly comprises a base portion adjacent said mounting surface to slidingly contact a tip end of the striker, a central spacer portion, and an upper portion.

7. The system of claim 6, wherein said central spacer portion comprises a pair of arms separated by a nominal spacing equal to a width of the striker head plus a distance D.

8. The system of claim 7, wherein said upper portion comprises a pair of rails separated by a nominal width equal to a width of the striker neck plus a distance d, where d is less than D.

9. The system of claim 8, wherein said rails which guide the neck of the striker are configured and positioned to maintain a side of the striker head out of contact with said arms.

10. The system of claim 1, wherein the temple panels of the inner helmet remain substantially parallel to their respective outer device mounting surfaces during installation and in the installed position.

11. The system of claim 10, wherein the head and neck of said strikers have a generally T-shaped cross-sectional profile.

12. The system of claim 1, wherein said outer device is an eyebox alignment fixture comprising means for positioning the strikers in a preset location with respect to the wearer's eyes.

13. A system for securing an outer device to an inner helmet comprising:

the inner helmet having two outwardly-facing temple panels with a striker mounted on each temple panel, and means adapted for aligning said strikers with respect to a wearer's eyes;

the outer device having a pair of inwardly-facing mounting surfaces, wherein one mounting surface faces each of the temples panels when said device is installed on the inner helmet; and an arcuate channel assembly disposed on each of said mounting surfaces adapted to capture the striker, wherein the arc of said channel assembly corresponds to a curve generated by pivoting the outer device from front-to-back over a crown portion of the inner helmet into an installed position.

14. The system of claim 13, wherein both of said temple panels of said inner helmet are substantially parallel to each other and to both of said outer device mounting surfaces.

15. A method for positioning an outer helmet display S at a viewing distance $V_D$ from a first line $E_L$ that is tangent to both of the front eyeball surfaces of a viewer comprising the steps of:

providing a pair of connection points on an inner helmet which define a connection line $C_L$ extending parallel to the first line $E_L$ and separated therefrom by a first vector $V_1$;

providing a pair of latch points on the outer helmet which define a latch line $L_L$ separated from the display by a second vector $V_2$; and mounting the outer helmet onto the inner helmet to align said latch line $L_L$ coincident with said connection line $C_L$, wherein a difference in magnitude between said first and second vectors is said viewing distance $V_D$.

16. The method of claim 15, wherein said viewing distance $V_D$ extends generally along a horizontal line of sight of the viewer and wherein the line of sight is perpendicular to the first line $E_L$.

17. The method of claim 16, wherein said first vector $V_1$ and said second vector $V_2$ are disposed in a common plane with the horizontal line of sight and wherein said first and second vectors extend perpendicular to the first line $E_L$.

18. The method of claim 17, wherein vertical components of sad first and second vectors are approximately the same.

19. The method of claim 17, wherein a difference between the horizontal components of said first and second vectors is equal to said viewing distance $V_D$.

20. The method of claim 15, wherein said connection line $C_L$ is disposed above the viewer's head and rearwardly of the viewer's eyeballs.

21. The method of claim 15, wherein said connection points comprise left and right connection points which are disposed within corresponding left and right vertical planes which are outwardly spaced from the viewer's head.

22. The method of claim 15, wherein said latch points comprise left and right latch points which pivot within corresponding left and right vertical planes which are outwardly spaced from the viewer's head.

23. A system for securing an outer device to an inner helmet having two outwardly-facing temple panels with a striker mounted on each temple panel, wherein the strikers have a head and a neck, the system comprising:

the outer device having a pair of inwardly-facing mounting surfaces, wherein one mounting surface faces each of the temple panels when said device is installed on the inner helmet; and an arcuate channel assembly disposed on each of said mounting surfaces adapted to capture the striker, wherein each arcuate channel assembly comprises a base portion adjacent said mounting surface to slidingly contact a tip end of the striker, a central spacer portion, and an upper portion, and wherein the arc of said channel assembly corresponds to a curve generated by pivoting the outer device from front-to-back over a crown portion of the inner helmet into an installed position.

24. The system of claim 23, wherein said central spacer portion comprises a pair of arms separated by a nominal spacing equal to a width of the striker head plus a distance D.

25. The system of claim 24, wherein said upper portion comprises a pair of rails separated by a nominal width equal to a width of the striker neck plus a distance d where d is less than D.

26. The system of claim 25, wherein said rails which guide the neck of the striker are configured and positioned to maintain a side of the striker head out of contact with said arms.

27. A system for securing an outer device to an inner helmet having two outwardly-facing temple panels with a striker mounted on each temple panel, wherein the strikers have a head and a neck, the system comprising:

the outer device having a pair of inwardly-facing mounting surfaces, with one mounting surface facing each of the temple panels when said device is installed on the inner helmet, and wherein said outer device is an eyebox alignment fixture comprising means for positioning the strikers in a preset location with respect to the wearer's eyes; and an arcuate channel assembly disposed on each of said mounting surfaces adapted to capture the striker, wherein the arc of said channel assembly corresponds to a curve generated by pivoting the outer device from front-to-back over a crown portion of the inner helmet into an installed position.

* * * * *

UNITED STATES PATENT AND TRADEMARK OFFICE
CERTIFICATE OF CORRECTION

| | |
|---|---|
| PATENT NO. | : 6,292,953 B1 |
| APPLICATION NO. | : 09/640442 |
| DATED | : September 25, 2001 |
| INVENTOR(S) | : Joseph A. Beautz |

Page 1 of 1

It is certified that error appears in the above-identified patent and that said Letters Patent is hereby corrected as shown below:

In column 1, line 2, insert the following:

--STATEMENT OF GOVERNMENT INTEREST

The U.S. Government has a paid-up license in this invention and the right in limited circumstances to require the patent owner to license others on reasonable terms as provided for by the terms of Contract Number N68335-95-C-0008 awarded by the Naval Air Warfare Center – Aircraft Division.--

Signed and Sealed this

Ninth Day of February, 2010

David J. Kappos
*Director of the United States Patent and Trademark Office*